United States Patent [19]

Sharp

[11] Patent Number: 5,297,512
[45] Date of Patent: Mar. 29, 1994

[54] VIBRATING AND ULTRASONIC SOUND EMITTING GROOMING DEVICE APPARATUS AND METHOD

[75] Inventor: Steve R. Sharp, Fort McMurray, Canada

[73] Assignee: Okanagan House Inc., Penticton, Canada

[21] Appl. No.: 60,655

[22] Filed: May 13, 1993

[51] Int. Cl.5 .................................................. A01K 13/00
[52] U.S. Cl. ..................................... 119/86; 132/119.1
[58] Field of Search ................. 119/83, 85, 86, 87, 119/156; 15/22.1; 132/119.1; 128/62 R

[56] References Cited

U.S. PATENT DOCUMENTS

| | | | |
|---|---|---|---|
| 3,840,030 | 10/1974 | Baker | 132/119.1 X |
| 3,870,056 | 3/1975 | Stemme | 132/119.1 |
| 3,942,538 | 3/1976 | Deppeler | 132/119.1 |
| 5,072,746 | 12/1991 | Kantor | 119/86 X |

FOREIGN PATENT DOCUMENTS

1456516 11/1976 United Kingdom ............ 132/119.1

Primary Examiner—Gene Mancene
Assistant Examiner—Thomas Price
Attorney, Agent, or Firm—Bull, Housser & Tupper

[57] ABSTRACT

An apparatus for grooming hair includes a hairbrush having a plurality of vibrating tines and facilities for emitting ultrasonic sound waves into the hair while grooming.

14 Claims, 1 Drawing Sheet

VIBRATING AND ULTRASONIC SOUND EMITTING GROOMING DEVICE APPARATUS AND METHOD

BACKGROUND OF THE INVENTION

This invention relates to grooming devices for hair, in particular for the hair or fur of an animal, such as a cat, dog, or horse.

Grooming an animal such as a dog, cat or horse can be very time consuming, especially when the animal has extremely tangled hair or fur and especially where the animal is infested with fleas or ticks. Tangled hair or fur must often be painstakingly separated and brushed a number of times to pull out any tendency to tangle. Often, this is accomplished with vigourous brushing which can be uncomfortable to the animal. Flea or tick infested hair or fur requires the use of a very fine toothed comb in order to gather up all of the fleas or ticks resident therein, provided such ticks have not burrowed into the animal's skin. The hair or fur must, however, be untangled before a fine toothed comb can be used; otherwise, the comb will snag on tangled portions of the hair or fur, resulting in the hair or fur being pulled out of the animal.

There is a need, therefore, to provide a grooming device which accomplishes both untangling and defleaing and which can save a groomer time, while providing a relatively gentle groom to the animal. The present invention addresses this need.

SUMMARY OF THE INVENTION

According to one aspect of the invention there is provided an apparatus for grooming hair, the apparatus comprising a hairbrush having a plurality of vibrating tines and ultrasonic sound emitting means for emitting ultrasonic sound waves into the hair.

Preferably, the hairbrush includes vibrating means for vibrating the tines and preferably the vibrating means includes means for rotating an object about an axis, the object having an uneven distribution of weight about the axis. In one embodiment, the vibrating means includes a motor mounted to a member connected to the tines, the motor having a rotatable shaft rotatable about an axis of rotation and a weight mounted to the shaft in a position displaced from the axis of rotation.

Preferably, the ultrasonic sound emitting means includes an ultrasonic emitter secured to a member having an opening therein such that ultrasonic sound waves emitted thereby are permitted to pass through the opening and disperse amongst the tines.

Also preferably, there is provided control means for selectively controlling the operation of the ultrasonic sound emitting means and the vibrating means.

Preferably, the hairbrush is portable and is powered by a battery.

According to another aspect of the invention, there is provided a method of grooming hair, the method comprising the step of emitting ultrasonic sound waves into the hair from a hairbrush having a plurality of vibrating tines.

According to another aspect of the invention there is provided an apparatus for grooming hair, the apparatus comprising a hairbrush having a plurality of vibrating tines.

The vibrating tine aspect of the invention provides stimulation to the scalp or other areas which may have hair to be groomed. In addition, the vibrating tines tend to untangle the hair as the hairbrush is moved through the hair. This is particularly advantageous when grooming animals such as cats, dogs and horses.

The ultrasonic emitting means is useful in emitting ultrasonic energy into the hair, resulting in exposing any ticks or fleas in the hair to such energy. It has been found that such creatures are repelled by ultrasonic energy and therefore the ultrasonic emitting means acts to sanitize the animal from fleas and ticks.

The combination of the vibrating means and the ultrasonic emitting means causes the tines of the hairbrush to vibrate an area of hair, tending to loosen any tangled hair, thereby making it difficult for fleas and ticks to find refuge within the hair, thereby leaving them little choice but to repel from the animal when exposed to the ultrasonic energy emanating from the ultrasonic emitting means.

BRIEF DESCRIPTION OF THE DRAWINGS

In a drawing which illustrates an embodiment of the invention.

DETAILED DESCRIPTION

Figure 1:
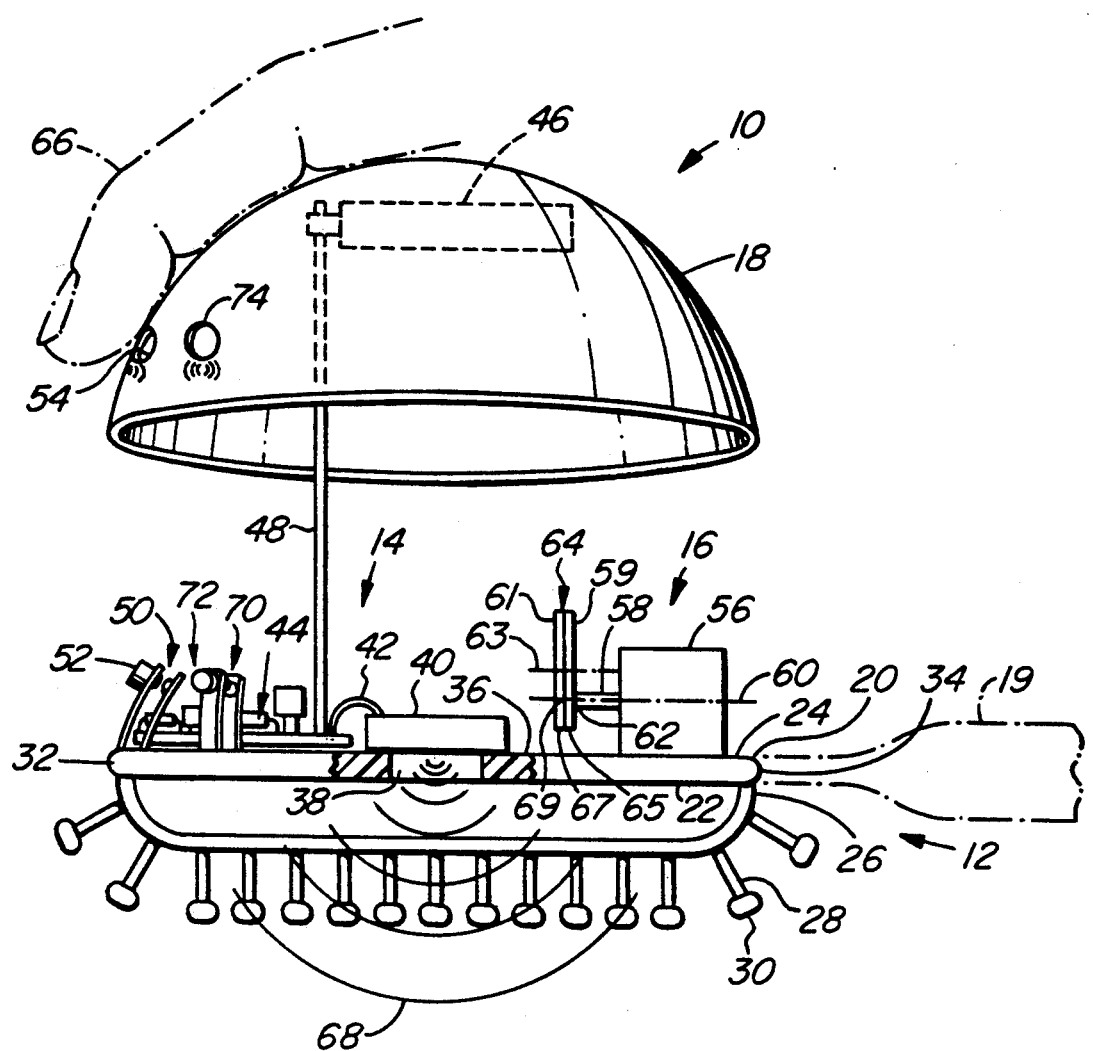
FIG. 1 is an exploded side view of an apparatus according to a first embodiment of the invention.

Referring to FIG. 1, an apparatus according to a first embodiment of the invention is shown generally at 10. The apparatus includes a hairbrush portion shown generally at 12. Mounted to the hairbrush portion is an ultrasonic sound signal generating circuit 14 and vibrating means shown generally at 16. A housing 18 is operable to be received over the ultrasonic sound signal generating circuit 14 and the vibrating means 16 to protect such components. The housing 18 has been shown in a position removed from the hairbrush portion 12 and in use, the housing 18 is secured by a friction fit directly to a first member 20 to which the ultrasonic sound signal generating circuit 14 and vibrating means 16 are mounted and thereby covers these components accordingly.

Optionally, a handle, shown in broken outline at 19, may be rigidly connected to the hairbrush portion 12.

The first member 20 has first and second opposite face sides 22 and 24. To the first face side is connected a concave mounting member 26 to which is secured a plurality of outwardly projecting tines 8, each approximately ⅜-inch in length and approximately 1/32-inch in diameter. Each of the tines has a plastic coated end portion 30 which serves to prevent the tines from scraping or tearing skin. In the preferred embodiment, there are approximately 18 tines per square inch.

The first member 20 has first and second opposite end portions 32 and 34 spaced apart by an intermediate portion 36. The intermediate portion has an opening 38 therein, the opening extending between the first and second face sides 22 and 24. Mounted directly over the opening 38 is an ultrasonic transducer 40.

The ultrasonic transducer is connected by wires 42 to an ultrasonic signal generating circuit shown generally at 44. The ultrasonic signal generating circuit receives electrical power from a battery 46 secured to the housing 18. In this embodiment, the battery includes two conventional 1.5 volt "AA" size penlight nickel cadmium rechargeable batteries.

The battery 46 is connected by wires 48 to the ultrasonic sound signal generating circuit 44. A first pair of contacts 50 having a first actuator 52 project upwardly from the second face side 24 such that the actuator is received through a first opening 54 in the housing 18. The actuator may, therefore, be depressed causing contacts 50 to close thereby completing a circuit supplying power from the battery 46 to the ultrasonic sound signal generating circuit 44.

The ultrasonic sound signal generating circuit 44 produces an ultrasonic sound signal having a frequency of approximately 30 kHz with sufficient intensity to affect fleas and ticks within approximately a 5-foot radius. In the embodiment shown, the ultrasonic sound signal generating circuit is provided by a Model LW-141S Flea Repeller produced by Wind Chase Enterprise Co., LTD. of Taipei Taiwan, R.O.C. The ultrasonic sound signal generating means 14 and ultrasonic transducer 40 act as ultrasonic sound emitting means for emitting ultrasonic sound waves into hair being groomed with the apparatus.

To the second end portion 34 of the first member 20, is secured a nominally rated 3-Volt DC motor 56 operable within a voltage range of 1.5 to 3 Volts and having a corresponding RPM range of between 700 and 1200 RPM. A second pair of contacts 70 having a second actuator 72 project upwardly from the second face side 24 such that the actuator is received through a second opening 74 in the housing 18. The actuator may, therefore, be depressed causing contacts 70 to close thereby completing a circuit supplying power from the battery 46 to the motor 56.

The motor has a shaft 58 having an axis of rotation 60. The shaft 58 has an end portion 62 to which is connected a weight 64, the weight being displaced from the axis of rotation 60 such that an uneven distribution of weight is secured to the shaft 58.

In the present embodiment, the weight is provided by two Canadian pennies 59 and 61 glued together in parallel relationship such that respective axes thereof are coincident to form a common axis 63 and outer edges 65 and 67 of the pennies are aligned. The pennies are glued onto the end portion 62 such that the axis of rotation 60 intersects the pennies at a point 69 midway between the outer edges 65 and 67 and the common axis 63. The centre of mass of the pennies is therefore displaced relative to the axis of rotation 60, resulting in an uneven distribution of weight about the axis of rotation 60 of the shaft 58 of the motor. This uneven distribution of weight causes a shaking or vibrating effect when the shaft is rotated and thereby imparts shaking and vibrating movement to the tines 28 by virtue of the connection between the concave mounting member 26 and the first member 20 to which the motor 56 is secured.

The first set of contacts 50 controlling the ultrasonic sound signal generating circuit 4 and the second set of contacts 70 controlling the motor 56 are independently controllable by a user of the device by simply pressing the first or second actuators 52 or 72. When grooming a pet indoors, only the vibrating aspect of the apparatus need be used, hence only the second actuator need be pressed to actuate the motor 56. When grooming outdoors, preferably, both the first and second actuators 52 and 72 are pressed to simultaneously actuate both the ultrasonic signal generating circuit 14 and the motor 56. Use of the ultrasonic signal generating circuit 14 is preferably undertaken outdoors as any fleas or ticks on the animal being groomed will repel from the animal to the immediate surroundings which, when outdoors may include grass, trees, etc. It is preferable not to use the ultrasonic signal generating circuit indoors as flea and ticks could repel from the animal to carpets and rugs where they may remain until grooming is finished, at which point they may find their way back onto the animal just groomed.

Operation

In operation, a user simply grasps the housing 18 in one hand such that an index finger 66 of the user is operable to actuate the first or second actuators 52 or 72, or such that a user's index finger is operable to operate the second actuator 72 and the user's middle finger (not shown) is operable to operate the first actuator 52. The apparatus is placed on the animal with the tines 28 protruding into the animal's hair or fur, and the desired actuator is depressed to close contacts 50 and/or contacts 70 to actuate the ultrasonic signal generating circuit 14 and/or the motor 56 respectively. With the desired actuator or actuators depressed the hairbrush is simply dragged through the animal's hair or fur.

Depressing the first actuator 52, closes the contacts 50, causing ultrasonic sound waves to be emitted amongst the tines and hence amongst the animal's hair or fur. The emittance of ultrasonic energy into the hair or fur results in exposure of any ticks or fleas in the hair or fur to such energy. Ticks or fleas are normally repelled by ultrasonic sound signals having frequencies above 25 kHz and therefore tend to repel from the animal.

Depressing the second actuator 72 closes contacts 70, thereby actuating the motor 56, causing weight 64 to be rotated about the axis of rotation 60 thereby imparting Vibration to the tines 28, resulting in a soothing, skin-stimulating feeling being imparted to the animal, while at the same time tending to loosen any tangled hair or fur.

The combination of the vibrating means and the ultrasonic emitting means causes the tines 28 of the hairbrush to vibrate an area of hair or fur, thereby making it difficult for fleas or ticks to find refuge within the hair or fur, while exposing ticks and fleas on the animal to ultrasonic sound energy. Therefore as tangled hair or fur is loosened, the animal is sanitized from fleas or ticks.

ALTERNATIVES

In an alternative embodiment, the ultrasonic sound emitting means is omitted and the apparatus acts as a device for stimulating the skin while grooming. In this embodiment, the vibrating means 16 acts to vibrate the tines 28 to provide stimulation to the Skin while grooming.

Generally, the operation of the apparatus may be summarized as a method of grooming hair, the method comprising the step of emitting ultrasonic sound waves into said hair from a hairbrush having a plurality of vibrating tines, while grooming said hair with said hairbrush. Optionally, the method may include the step of rotating an object about an axis, the object having an uneven distribution of weight about the axis. Preferably, the ultrasonic sound waves are dispersed amongst the tines and preferably the vibration of the tines and the presence or absence of the ultrasonic sound waves are independently controllable.

While specific embodiments of the invention have been described and illustrated, such embodiments should be considered illustrative of the invention only and not as limiting the invention as construed in accordance with the accompanying claims.

What is claimed is:

1. An apparatus for grooming hair, the apparatus comprising a hairbrush having a plurality of vibrating tines and ultrasonic sound emitting means for emitting ultrasonic sound waves into said hair.

2. An apparatus as claimed in claim 1 wherein said hairbrush includes vibrating means for vibrating said tines.

3. An apparatus as claimed in claim 2 wherein the hairbrush includes a member having first and second face sides, the tines being mounted on said first face side and said vibrating means being mounted on said second face side.

4. An apparatus as claimed in claim 3 wherein said vibrating means includes means for rotating an object about an axis, the object having an uneven distribution of weight about said axis.

5. An apparatus as claimed in claim 4 wherein the means for rotating includes a motor mounted to said second face side of said member, said motor having a rotatable shaft rotatable about an axis of rotation and a weight mounted to said shaft in a position displaced from said axis of rotation.

6. An apparatus as claimed in claim 3 wherein said member has at least one opening disposed amongst said tines and wherein said ultrasonic sound emitting means includes an ultrasonic emitter secured to said second face side such that ultrasonic sound waves emitted thereby are permitted to pass through said opening and disperse amongst said tines.

7. An apparatus as claimed in claim 2 further including control means for selectively controlling the operation of the ultrasonic sound emitting means and the vibrating means.

8. An apparatus as claimed in claim 7 further including a battery for supplying said electrical power to said sound emitting means and said vibrating means.

9. A method of grooming hair, the method comprising the step of emitting ultrasonic sound waves into said hair from a hairbrush having a plurality of vibrating tines, while grooming said hair with said hairbrush.

10. A method as claimed in claim 9 further including the step of rotating an object about an axis, the object having an uneven distribution of weight about said axis.

11. A method as claimed in claim 9 further including the step of passing said ultrasonic sound waves through an opening in a member of the hairbrush to which the tines are attached, such that said ultrasonic sound waves are dispersed amongst said tines.

12. A method as claimed in claim 9 further including the step of controlling the vibration of said tines and the presence or absence of said ultrasonic sound waves.

13. An apparatus for grooming hair, the apparatus comprising a hairbrush having a plurality of outwardly projecting tines and ultrasonic sound emitting means for emitting ultrasonic sound waves into said hair.

14. An apparatus as claimed in claim 13 wherein the hairbrush includes a member having first and second face sides, the tines being mounted on said first face side, said member having at least one opening disposed amongst said tines and wherein said ultrasonic sound emitting means includes an ultrasonic emitter secured to said second face side such that ultrasonic sound waves emitted thereby are permitted to pass through said opening and disperse amongst said tines.

* * * * *